Patented Sept. 23, 1941

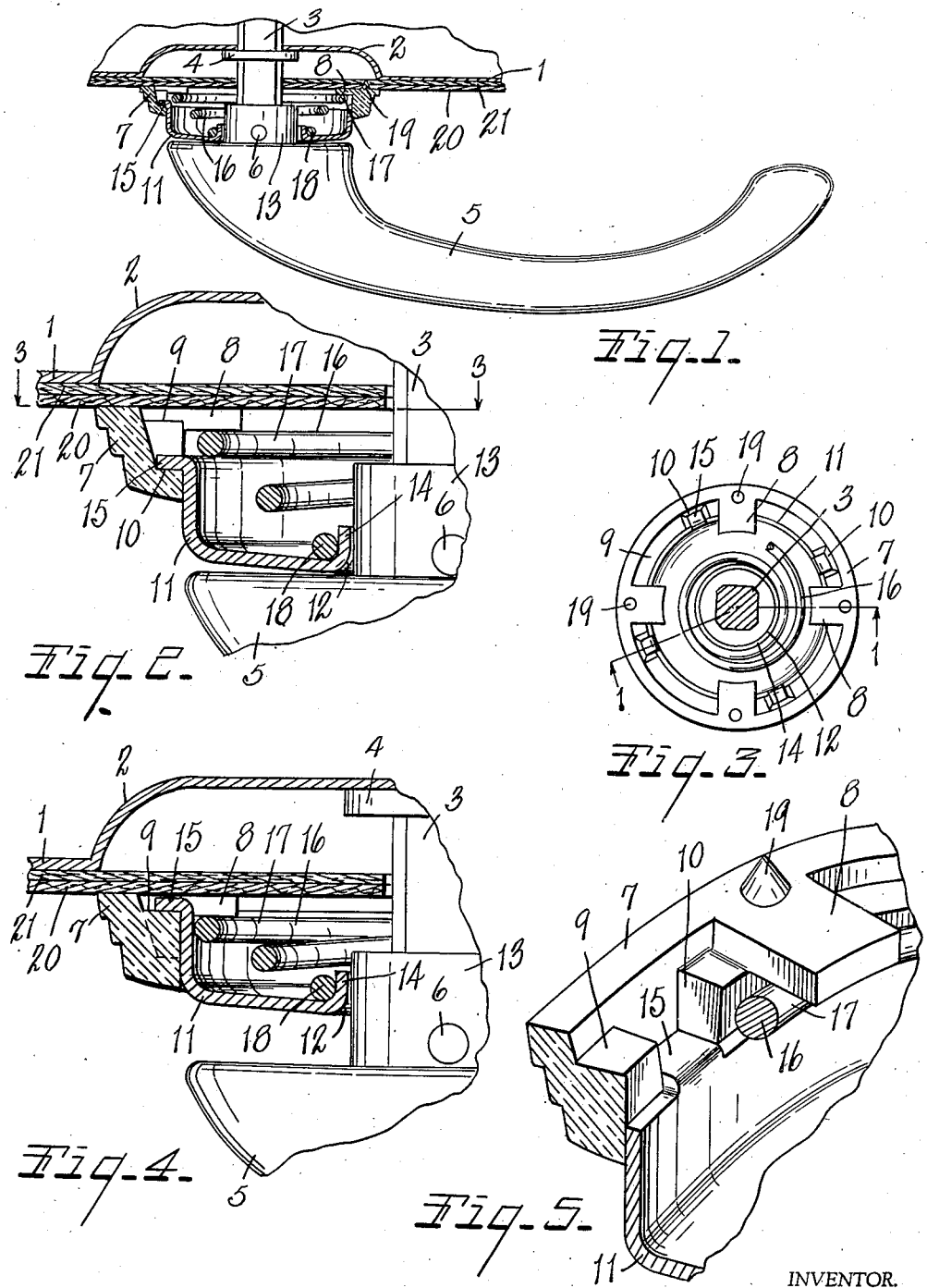

2,256,710

UNITED STATES PATENT OFFICE 2,256,710

ESCUTCHEON FOR MOTOR VEHICLE DOOR HANDLES, REMOTE DOOR HANDLES, AND THE LIKE

Albert W. Gowdy, Grand Rapids, Mich., assignor to W. B. Jarvis Company, Grand Rapids, Mich., a corporation of Michigan Application October 28, 1940, Serial No. 363,152

6 Claims. (Cl. 292—357)

The main objects of this invention are:

First, to provide an escutcheon remote control handle for motor vehicle doors, windows, and the like which is simple in its parts, very easily installed, and at the same time very attractive in appearance.

Second, to provide a structure of the class described which may be economically produced and at the same time is strong and durable and attractive in appearance.

Objects relating to details and economies of the invention will appear from the description to follow. The invention is defined and pointed out in the claims.

A preferred embodiment of the invention is illustrated in the accompanying drawing, in which:

Fig. 1 is a fragmentary view partially in section on a line corresponding to line 1—1 of Fig. 3 of a remote control door handle embodying the features of my invention, the structure being shown in operative relation to the door and handle and its spindle.

Fig. 2 is an enlarged fragmentary view partially in section on a line corresponding to that of Fig. 1 more clearly illustrating certain structural details.

Fig. 3 is a vertical or bottom view of the escutcheon on a line corresponding to line 3—3 of Fig. 2.

Fig. 4 is a fragmentary view generally similar to that of Fig. 2 illustrating the escutcheon members in collapsed position and certain steps of assembling with the cooperating parts.

Fig. 5 is an enlarged fragmentary vertical perspective view showing further structural details.

In the accompanying drawing, I have illustrated my improvements in an inside remote control handle for automobile doors, but it will be understood that my invention has a wide adaptation to other types of handles, levers, controls, and the like.

Referring to the accompanying drawing, the numeral 1 indicates a door panel of an automobile or other mounting panel having a recess 2 therein which is apertured to receive the spindle 3 having a stop 4 thereon. In certain extensively used escutcheon assemblies the space provided by the recess 2 is utilized to accommodate a spring which bears against a depressible finish panel to enable the escutcheon and panel to be depressed or pushed inwardly for assembly of the handle 5 on the spindle, the handle being retained by means of the pin 6.

The escutcheon of my invention comprises a base member 7 which is preferably formed of a suitable plastic material of attractive design and color, it being feasible to have the color correspond to or harmonize with the color scheme of the interior of the vehicle.

This base member is of generally annular form and is provided with spaced inwardly projecting spring supporting members 8, these being radially disposed as shown in Fig. 3. Between these members I provide rearwardly facing shoulders 9 having recesses 10 therein, or in effect, I provide rearwardly facing stepped shoulders.

The cup-like top member 11 of the escutcheon is preferably formed as a sheet metal stamping and is telescopingly and rotatably received within the base member. This top member is provided with a central opening 12 receiving the hub 13 of the handle, the opening being surrounded by an inturned flange 14.

The side walls of the member 11 are provided with out-turned or radially disposed lugs 15 which may be engaged with the shoulder 9 or with the recesses 10 thereof.

The helically coiled spring 16 has its base coil 17 seated on the spring supports 8 and its smaller or top coil 18 embracing and seated within the flange 14 on the top member.

In assembling, the top member is telescoped within the base member prior to the bending of the lugs 15, the lugs being bent outwardly after the parts are assembled, including the spring, so that the parts are all held in assembled relation. However, the parts may be collapsed together and relatively rotated to bring the lugs 15 on the higher portion of the shoulder 9 thereby retaining the top member in its collapsed position as shown in Fig. 4. This permits the application of the handle to the spindle and its insertion of the pin 6. After this is done, slight rotative movement of the top member brings the lugs 15 into register with the recessed portion 10 of the shoulder or the lower steps of the shoulders and the spring urges the top member to its outer position or erected position and retains it in that position.

The outer or top portion of the escutcheon is, as stated, preferably a sheet metal stamping which has advantage from the forming standpoint although it may be formed of plastic material but it is the contrasting of the suitably plated metal member with the plastic base member which results in a very attractive appearance.

The base member is preferably provided with conical anchoring studs 19 which embed in the upholstery indicated at 20 and the upholstery supporting panel indicated at 21.

The escutcheons may be shipped from the factory in the collapsed position, ready for installation. This obviously has the advantage of compactness for shipping and storage. Another advantage is that the parts are preassembled or factory-assembled and may be very quickly installed in the application of the hardware to a motor vehicle.

Further, while the parts may be made attractive and ornamental in appearance, they are so arranged that they are not subject to any undue stresses.

I have not attempted to illustrate or describe certain other adaptations as it is believed that this disclosure will enable those skilled in the art to embody or adapt the same as may be desired.

Having thus described my invention, what I claim as new and desire to secure by Letters Patent, is:

1. In an escutcheon of the class described, the combination of an annular base member provided with inwardly projecting spaced spring supporting members and with internal rearwardly facing segmental shoulders having recesses therein, a cup-like top member having a central opening surrounded by an inturned flange, said top member being telescopingly and rotatably arranged within said base member and having out-turned lugs selectively engageable with said shoulders of said base member or with their said recesses, and a helically coiled spring having its larger coil seated on said spring supporting members of said base member and its smaller coil embracing said flange of said top member whereby said top member may be collapsed within said base member and its lugs engaged with said shoulders or may be manipulated to engage its said lugs with said recesses permitting the spring to urge the top member to its extended position and yieldably retain it in such position.

2. In an escutcheon of the class described, the combination of an annular base member provided with inwardly projecting spaced spring supporting members and with internal rearwardly facing shoulders having recesses therein, a cup-like top member telescopingly and rotatably arranged within said base member and having out-turned lugs selectively engageable with said shoulders of said base member or with their said recesses, and a spring seated on said spring supporting members of said base member and in thrusting engagement with said top member whereby said top member may be collapsed within said base member and its lugs engaged with said shoulders or may be manipulated to position its said lugs within said recesses permitting the spring to urge the top member to its extended position and yieldably retain it in such position.

3. In an escutcheon of the class described, the combination of an annular base member provided with spring supporting means and with internal inwardly facing stepped shoulders, a cup-like top member telescopingly and rotatably arranged within said base member and having out-turned lugs selectively engageable with the steps of said shoulders, said top member having a central opening with an inwardly directed flange, and a helically coiled spring having its larger coil seated on said spring supporting means of said base member and its smaller coil embracing said flange on said top member, said top member being rotatable for selectively positioning said lugs on said stepped shoulders for retaining the top member in collapsed position within the base member or permitting its extension by said spring.

4. In an escutcheon of the class described, the combination of an annular base member provided with spring supporting means and with internal inwardly facing stepped shoulders, a cup-like top member telescopingly and rotatably arranged within said base member and having out-turned lugs selectively engageable with the steps of said shoulders, and a coiled spring seated on said spring supporting means of said base member and in thrusting engagement with said top member, said top member being rotatable for selectively positioning said lugs on said stepped shoulders for retaining the top member in collapsed position within the base member or permitting its extension by said spring.

5. A self-contained escutcheon unit comprising an escutcheon base member adapted to engage a door panel at its rear surface and having a central aperture, a hollow cup-like escutcheon top member telescopingly receivable in said aperture, and spring means disposed between said members to resiliently urge the same axially and effect relative telescoping movement thereof, one of said members having a plurality of angularly spaced, radially disposed ears and the other thereof having a shoulder engageable by said ears in one angular position of the top relative to the base to restrain the top from telescoping extending movement under the influence of said spring, said other member also having axial recesses corresponding in number and spacing to said ears to receive the latter for telescoping movement of the top under the influence of said spring whereby the top may be selectively depressed or extended relative to the base in accordance with the angular position thereof to permit assembly of said handle on an operating spindle extending through the panel.

6. A self-contained escutcheon unit comprising an escutcheon base member adapted to engage a door panel at its rear surface and having a central aperture, a hollow-cup-like escutcheon top member telescopingly receivable in said aperture, and spring means disposed between said members to resiliently urge the same axially and effect relative telescoping movement thereof, one of said members having a plurality of angularly spaced, radially disposed ears and the other thereof having portions of greater and lesser axial thickness selectively engageable by said ears in accordance with the angular position of the top relative to the base to restrain the top from telescoping extending movement under the influence of said spring or to permit said movement whereby the top may be selectively depressed or extended relative to the base to permit assembly of said handle on an operating spindle extending through the panel.

ALBERT W. GOWDY.